United States Patent [19]

Ingleby

[11] Patent Number: 4,655,371
[45] Date of Patent: Apr. 7, 1987

[54] APPARATUS FOR DISPENSING PARTICULATE MATERIAL

[76] Inventor: Leslie W. Ingleby, 240 Allan Drive, Swift Current, Saskatchewan, Canada, S9H 3A3

[21] Appl. No.: 822,262

[22] Filed: Jan. 24, 1986

[51] Int. Cl.⁴ .............................................. G01F 11/10
[52] U.S. Cl. .................................. 222/355; 222/366; 222/430
[58] Field of Search ............... 222/366, 361, 284, 161, 222/362, 363, 450, 453, 430, 559, 561, 544, 565, 355, 354, 344

[56] References Cited

U.S. PATENT DOCUMENTS 1,676,348  7/1928  O'Leary ............................. 222/366
4,015,602  4/1977  Nelson et al. ....................... 222/561

Primary Examiner—Joseph J. Rolla
Assistant Examiner—Kenneth Noland
Attorney, Agent, or Firm—Adrian D. Battison; Stanley G. Ade

[57] ABSTRACT

An apparatus for dispensing particulate material particularly spices includes a closure portion for a container which may or may not be part of the container and defining an opening in the closure portion. A pair of parallel grooves are defined in the closure portion for receiving a plate-like cover member which slides along the grooves to close the opening. A measuring member separate from the closure portion and the cover member can be engaged with the cover member by a peg and recess coupling and then slid along the grooves in common movement with the cover member to a position where it receives a measured charge of the material. The measuring member can then be withdrawn which acts also to withdraw the cover member to re-cover the opening. A separate shaker piece can also be inserted into the slide grooves to displace the cover member, the shaker piece having perforations so that the material can be dispensed by shaking from the covered opening.

10 Claims, 6 Drawing Figures

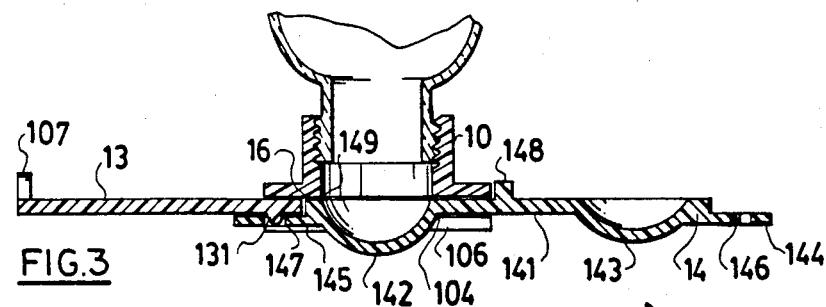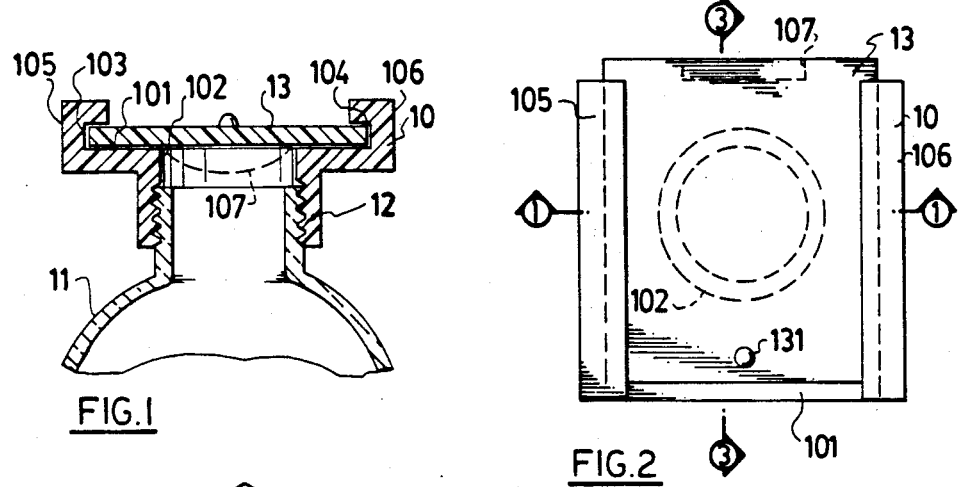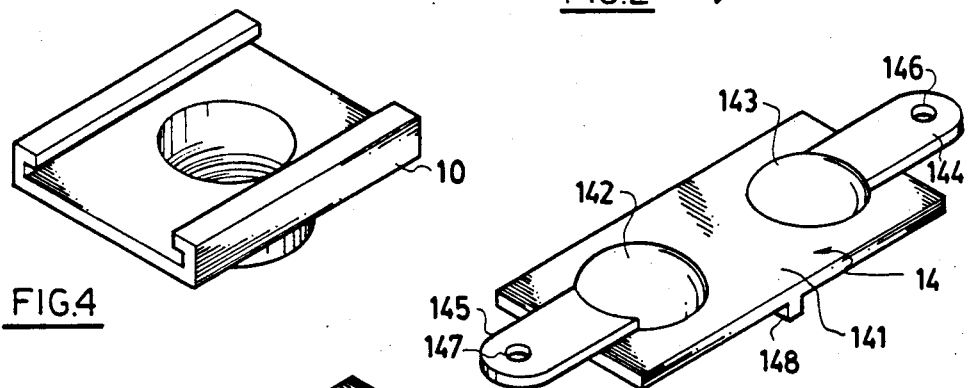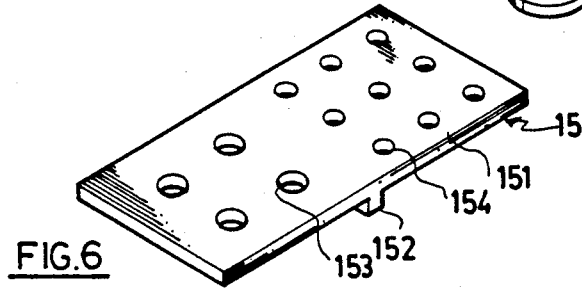

APPARATUS FOR DISPENSING PARTICULATE MATERIAL

BACKGROUND OF THE INVENTION

This invention relates to apparatus for dispensing particulate material which is particularly, but not exclusively, designed for dispensing spices in a measured charge.

Many devices have been manufactured or proposed in previous years for dispensing various different types of particulate materials for example, coffee, spices, washing powder and sugar.

One type of dispenser for this purpose comprises a closure member for a container which defines an opening through which the material can be dispensed. A measuring device forming one or more pockets is positioned for sliding movement adjacent the opening so that it can move from a position underlying the opening to a second position in which the pockets are spaced from the opening and a plate portion closes the opening. In this second position, the pockets are moved to an opening in a dispensing cover so that the material drops from the pocket through the dispensing opening. Thus the dispensing opening and the container opening are offset so that each movement of the measuring dispenser collects a charge and then deposits the charge.

Such arrangements are shown for example, in U.S. Pat. Nos. 2,767,889, 2,639,837 and 3,973,704.

All of these devices have a number of disadvantages. Firstly, the measuring device is built-in or a essential part of the container and therefore, each container requires a separate measuring device. Secondly, the bottom discharge does not allow a visible check to be made to ensure that the measure is full before discharge. Thus, if a blockage in a damp material occurs, only a part measure may be dispensed. Thirdly, the device being an integral unit is difficult to clean and difficult to overcome any blockages.

Further, devices of a similar general type are shown in U.S. Pat. Nos. 1,676,348, 2,063,605 and 4,531,658. In these arrangements a similar pocket is moved to a discharge opening to collect a charge and then moved beyond one end of the container closure so the whole container can be inverted and the charge dispensed. Again these arrangements have significant disadvantages in that they are difficult to clean and each container requires a separate measuring force.

SUMMARY OF THE INVENTION

It is one object of the present invention, therefore, to provide an improved apparatus for dispensing particulate material which is of simple construction, simple and easy to clean and provides ready inspection of the charge of material so that each charge can be insured to be of the full amount which is particularly important in relation to spices.

According to the invention, therefore, there is provided an apparatus for dispensing particulate material comprising means defining a container closure portion for containing within a container portion the particulate material, said closure portion defining an opening therein through which said particular material can be discharged, a cover member, slide guide means for receiving said cover member on said closure portion for sliding movement relative thereto so as to move from a first position closing said opening to a second position exposing said opening for discharge of said material, and a measuring member separate from said closure portion, said measuring member having a receptacle portion for receiving and measuring a charge of said particulate material, means for engaging said slide guide means whereby said measuring member can be moved in sliding movement along said slide guide means from a first position spaced from said opening to a second position in which said receptacle part underlies the opening for receiving said charge, and means for releasably engaging said cover member whereby said measuring member can be engaged with said cover member with both members in their respective first positions such that the cover member and the measuring member can be moved commonly along said slide guide means to said second positions thereof, to obtain said charge and back to said first positions to close said opening and allow removal of said measuring member for dispensing said charge.

The invention has the advantage, therefore, that the measuring member is a separate item which can be used with a number of the dispensing containers and can be inserted onto the closure portion so as to slide with the cover member so that the opening is at all times properly closed by either the cover member or the measuring member. The measuring member is preferably coupled to the cover member by a peg and recess coupling at right angles to the sliding direction. In this way the measuring member draws the cover member with it to one end of the slide guide so the container is closed by the cover member. The measuring member can then be removed from the container, the charge dispensed and the measuring member replaced in storage or used again for further charges. In addition, this enables a single spice container to be used with measuring members having different sized receptacles or pockets so as to create a different size charge of the material.

In the preferred arrangement, the measuring member is not forced through the particulate material to obtain its charge which in some cases could cause compression and packing of particular spices.

It will be appreciated in this regard that spices come in various different types, varying from fine powders with poor flowability to granular material which flows very easily and also including chopped leaves which have very different flow characteristics from either of those materials.

The closure portion can itself form part of a complete container or it can form a separate item which can be attached to a container, for example, in replacement for the conventional screw top lid.

This spice dispenser preferably comprises a container for spices, which accepts a number of different sliding closures. An alternative arrangement is to make it as a screw top to fit on another container. The container version has a number of advantages over the screw top arrangement of this invention, and over other inventions which are designed to fit onto different containers to dispense particulate material.

These advantages are:

A. Cost to the Consumer

The cost of production would be very close to make either version, but in one case the consumer would have to purchase two items instead of only one.

B. Appearance

In many kitchens spice racks are hung on the wall in plain sight, and the container would provide a more attractive appearance than the containers with screw tops.

C. The Difficulty of Lining Up a Square Screw Cap on a Square Bottle.

Many glass spice bottles are square, and they are not all threaded the same, this could result in the corners of the cap protruding in line with the side of the bottle, which would not only spoil the appearance but could prevent the bottle from fitting into a spice rack.

With the foregoing in view, and other advantages as will become apparent to those skilled in the art to which this invention relates as this specification proceeds, the invention is hereby described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a transverse cross sectional view through a dispensing apparatus according to the invention showing the cover member in closed position.

FIG. 2 is a plan view of the apparatus of FIG. 1.

FIG. 3 is a cross sectional view along the lines 3—3 of FIG. 2 showing the measuring member in position to receive a charge of material.

FIG. 4 is an isometric view of the closure portion per se.

FIG. 5 is an isometric view of a measuring member per se.

FIG. 6 is an isometric view of a shaker member per se.

In the drawings like characters of reference indicate corresponding parts in the different figures.

DETAILED DESCRIPTION

An apparatus for dispensing particulate material as shown in the drawings comprises a closure portion 10 for a container indicated at 11. In this embodiment the closure portion is separate from the container and is attached thereto by a screw thread indicated at 12 so that a container including a conventional screw top can be used to replace the container 11 when emptied.

In addition the apparatus comprises a cover member 13, a measuring member 14, and a shaker member 15. In practice a kit of such parts would comprise a plurality of identical closure portions 10 for a number of different containers in a spice rack, possibly 2 measuring members 14 of different measuring sizes and one of the shaker members 15.

The closure portion 10 defines a planar surface 101 into which an opening 102 breaks from the screw thread area 12 of the container 11. Parallel to the planar surface 101 is arranged a pair of slide groves 103, 104 defined in upstanding edge pieces 105, 106 which extend longitudinally of the planar surface 101. Thus the closure portion can slidingly receive a planar plate section of the cover member 13 as a sliding fit. As shown in FIGS. 1 and 2, the cover member is in the closed position but can slide longitudinally along the surface 101 to cover the opening 102 until a stop portion 107 engages one end of the closure portion 10. The cover member is held in position by a friction fit within the grooves so it can slide easily by manual operation but cannot accidentally fall into an open position.

The separate measuring member 14 shown in FIGS. 3 and 5 and comprises effectively a plate portion 141 which is shaped to be received within the grooves 103, 104 on the surface 101. The plate portion 141 includes a pair of bowl-shaped recesses 142, 143 which project outwardly from one surface of the plate portion 141 and break out to define an opening on the other surface thus forming a receptacle for a charge of the material from the container. It will be noted that the bowl-shaped receptacles 142, 143 are of different sizes and for example, one would provide a measure representing a whole teaspoon and the other for example representing half a teaspoon with a second such measuring member providing yet further measures.

A projecting portion 144, 145 extends outwardly from each end of the plate portion 141 lying in a plane directly adjacent the surface through which the receptacles project so as to directly overlie that surface. An opening 146, 147 is provided in each of the projecting portions substantially on a centre line of the plate portion 141.

The cover member 13 includes a peg 131 on a centre line thereof projecting outwardly therefrom substantially at right angles to the direction of motion along from the container.

Referring now particularly to FIG. 3, it will noted that the position of the openings 146 and 147 are such that the peg 131 can project therethrough with the edges of the cover member and the measuring member substantially abutting as indicated at 16. In operation, therefore, in the positions substantially shown in FIG. 2, the measuring member is applied to the closure portion so the peg 131 projects through one of the openings 146, 147 and the edges of the cover member and measuring member are arranged in abutting relation as indicated at 16.

In this position and only in this position, the measuring member can slide into the grooves 103, 104 to take up the position shown in FIG. 3. During this movement the cover member and the measuring member must move commonly and are linked together by the peg and opening coupling. One of the measuring receptacles is thus moved to the opening 102 until a stop 148 across the undersurface of the measuring member at a mid-line thereof engages an edge of the closure portion 10. This prevents the measuring member being inserted so far that the the cover member falls from the other end of the guide formed by the slots 103, 104 and ensures that when the measuring member is withdrawn carrying its charge of the material, it also withdraws the cover member 13 to close the opening. The fact that the edges 16 of the measuring member and cover member abutt ensures that the material at the opening is compressed as little as possible since it is wiped by the edge of the receptacle or recess 142, the edge being indicated at 149.

As the measuring member reaches the extreme end of the guide, it is released from the guide and thus can be removed from the peg by a movement at right angles to its sliding movement. At this point, the stop 107 has already engaged the edge of the closure portion 10 to locate the cover member in position.

Before removing the measuring member in this way, a visual inspection can be made of the material in the receptacle 142 to ensure that it is a complete charge of the receptacle.

Further charges of the receptacle can be made by repeating the above process or alternatively different charges can be obtained by using the different size receptacles 143 and others not shown.

In the case where the dispenser is required to be used as a shaking type dispenser, the cover member 13 is displaced in the slide in a similar manner to that described above by the shaker member 15. For this purpose the shaker member defines a plate portion 151 of dimensions to be received within the grooves 103, 104 and a stop 152 similar to the stop 148 which engages an edge of the closure. As the shaker member 15 is generally not retained in the inverted position of FIG. 3 when shaking is complete, it does not necessarily need the projecting portions 144, 145 similar to the measuring member but instead can comprise a simple plate which displaces the cover member and leave the cover member to be replaced manually by pressing against the stop 107. The shaker member provides two different size of openings 153, 154 which can be chosen by inserting one end or other end of the shaker member depending upon the flow characteristics of the material to be dispensed.

In an alternative arrangement (not shown), the closure portion 10 forms part of a complete container and is not separatable from the container. In this case, a purchaser of the complete apparatus would buy a number of such containers each for receiving a different type of spice and would then fill those containers from supply containers. In such an arrangement, however, the cover member, measuring members and shaker member would remain substantially of the design and arrangement as illustrated and described above.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus for dispensing particulate material comprising means defining a container closure portion for containing within a container portion the particulate material, said closure portion defining an opening therein through which said particular material can be discharged, a cover member, slide guide means for receiving said cover member on said closure portion for sliding movement relative thereto so as to move from a first position closing said opening to a second position exposing said opening for discharge of said material, and a measuring member separate from said closure portion, said measuring member having a receptacle portion for receiving and measuring a charge of said particulate material, means for engaging said slide guide means whereby said measuring member can be moved in sliding movement along said slide guide means from a first position spaced from said opening to a second position in which said receptacle part underlies the opening for receiving said charge, and means for releasably engaging said cover member whereby said measuring member can be engaged with said cover member with both members in their respective first positions such that the cover member and the measuring member can be moved commonly along said slide guide means to said second positions thereof, to obtain said charge and back to said first positions to close said opening and allow removal of said measuring member for dispensing said charge.

2. The invention according to claim 1 including stop means for preventing movement of said cover member past said first position and for preventing movement of said measuring member past said second position.

3. The invention according to claim 2 wherein said stop means comprises of first stop on said measuring member for engaging said closure portion and the second stop on said cover member for engaging said closure portion.

4. The invention according to claim 1, wherein said slide guide means comprises means defining a pair of opposed grooves and wherein each of said cover member and measuring members includes a plate portion defining flanges for sliding in said opposed grooves.

5. The invention according to claim 4, wherein said means for releasibly engaging comprises a portion of one of said cover member and said measuring member narrower than said flanges and lying in a plane different from the plate portion of the other of said cover member and measuring member so as to extend beyond one edge of the plate portion of said one of said cover member and measuring member to engage the other of said cover member and measuring member.

6. The invention according to claim 5, wherein releasibly engaging means includes a peg on one of said measuring member and cover member and a recess on the other of said measuring member and cover member arranged with the peg extending substantially at right angles to the direction of sliding movement, whereby the measuring member can be released from engagement with said cover member only by movement in a direction of right angles to said sliding movement and only in said first position at one end of said slide guide means.

7. The invention according to claim 1, wherein the receptacle portion defines a closed pocket facing towards said opening whereby said charge can be dispensed by removing said measuring member from said closure portion and inverting said measuring member.

8. The invention according to claim 7, wherein the closed pocket is bowl-shaped so as to define a smoothly curved inner surface.

9. The invention according to claim 1, wherein said measuring member includes two receptacle portions and two means for releasibly engaging said cover member whereby said measuring member can be engaged with said cover member in two different orientations in each of which a chosen one of said receptacle portions is moved to corporate with said opening.

10. The invention according to claim 1, including a separate shaker member comprising a plate member for sliding in said slide guide means, said plate member having a plurality of holes therein whereby a shaking action of said container can discharge said material through said shaker member.

* * * * *